(12) United States Patent
Ohta

(10) Patent No.: US 7,003,137 B2
(45) Date of Patent: Feb. 21, 2006

(54) TARGET RECOGNITION APPARATUS

(75) Inventor: Akihiro Ohta, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 615 days.

(21) Appl. No.: 10/052,029

(22) Filed: Jan. 15, 2002

(65) Prior Publication Data

US 2002/0131621 A1 Sep. 19, 2002

(30) Foreign Application Priority Data

Jan. 16, 2001 (JP) ............................. 2001-008125

(51) Int. Cl.
*G06K 9/00* (2006.01)
(52) U.S. Cl. ...................... 382/104; 340/435
(58) Field of Classification Search ............... 701/301, 701/300, 117, 96, 65; 340/991, 992, 990, 340/988, 961, 686.6, 477, 435; 382/100, 382/103, 104, 106, 107
See application file for complete search history.

(56) References Cited

U.S. PATENT DOCUMENTS

| 4,497,065 A | * | 1/1985 | Tisdale et al. ............... 382/103 |
| 5,307,136 A | * | 4/1994 | Saneyoshi .................. 356/3.14 |
| 5,400,244 A | * | 3/1995 | Watanabe et al. ............. 701/28 |
| 6,097,315 A | * | 8/2000 | Minter ........................ 340/961 |
| 6,184,781 B1 | * | 2/2001 | Ramakesavan ............. 340/435 |
| 6,385,529 B1 | * | 5/2002 | Minowa et al. ............... 701/96 |
| 6,570,998 B1 | * | 5/2003 | Ohtsuka et al. ............. 382/104 |
| 6,766,038 B1 | * | 7/2004 | Sakuma et al. ............. 382/107 |

FOREIGN PATENT DOCUMENTS

JP      11-339017 A     12/1999

* cited by examiner

*Primary Examiner*—Jingge Wu
*Assistant Examiner*—Abolfazl Tabatabai
(74) *Attorney, Agent, or Firm*—Christie, Parker and Hale, LLP

(57) ABSTRACT

A target recognition apparatus that improves a recognition rate of a target by emphasizing vertical components of picked-up images, even if the target has a round shape of which the edges are is difficult to extract. The target recognition apparatus carries out the following processes. It compresses two images that have been simultaneously picked up with a left camera and a right camera that are mounted on a vehicle, in a lateral direction respectively. It detects both ends of the target in the two images, based on gradations of pixels in the images that have been compressed in this lateral direction. It measures a distance to the target, based on a parallax of the both detected ends of the target. A searching area of a target can be set based on the images compressed in a lateral direction.

21 Claims, 16 Drawing Sheets

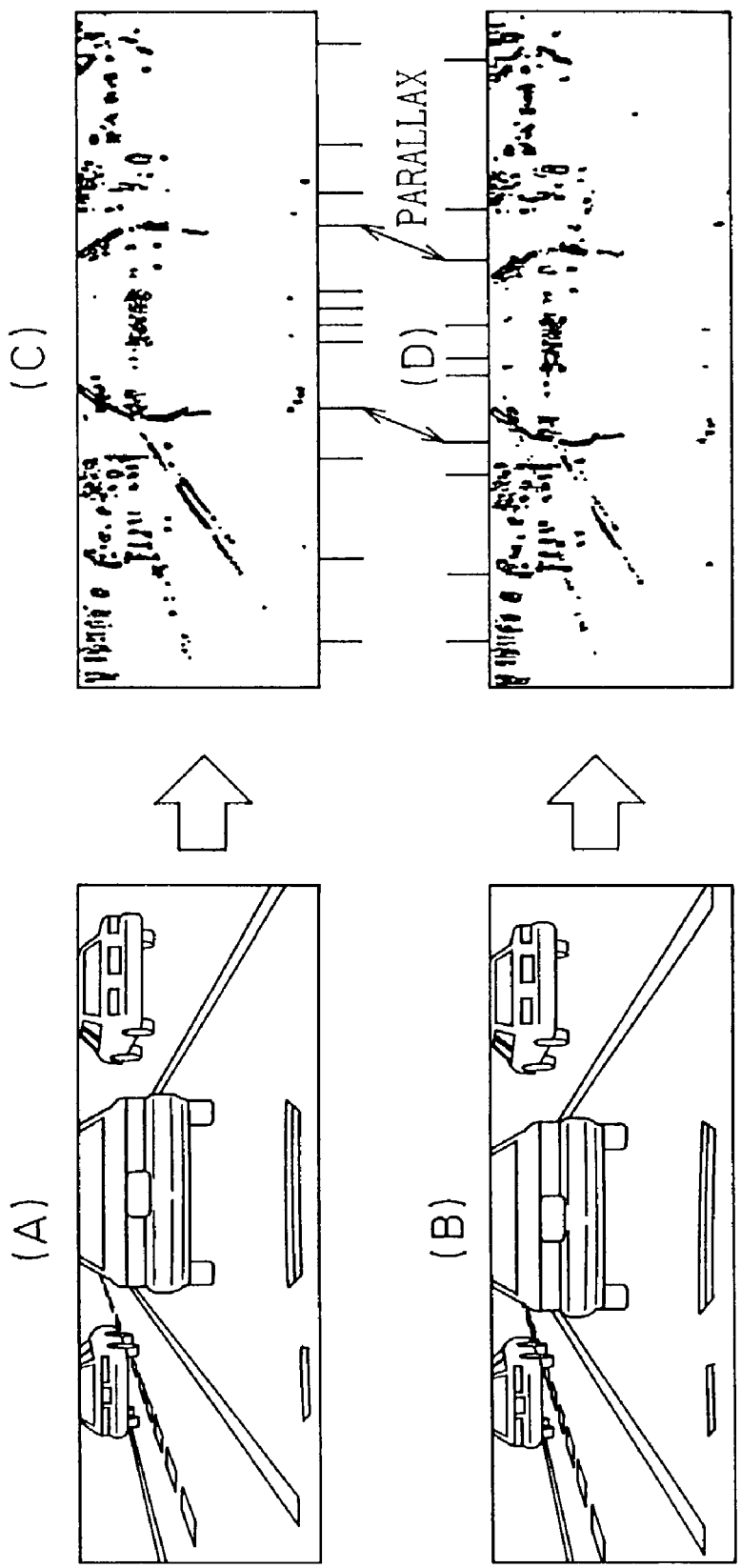

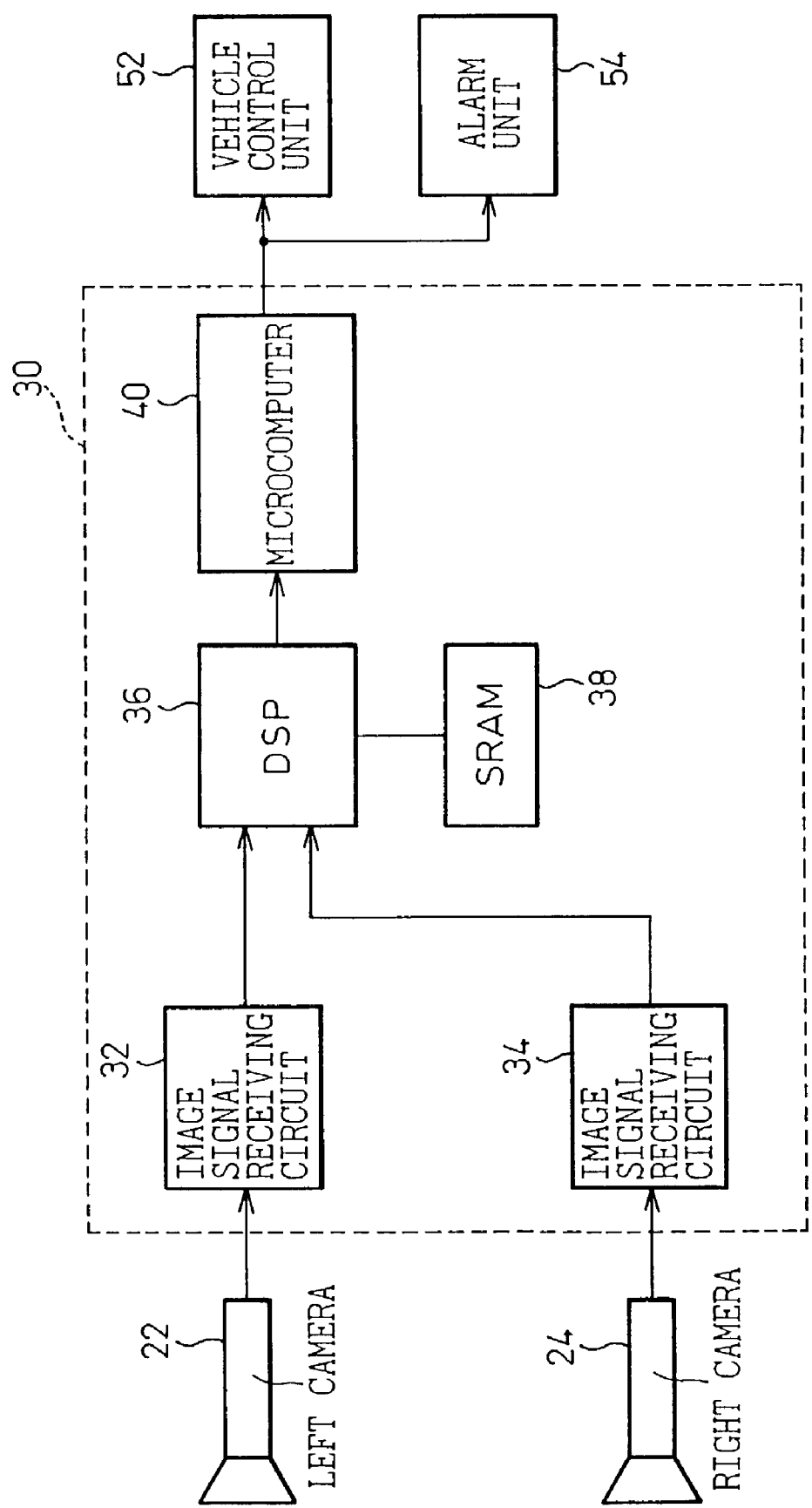

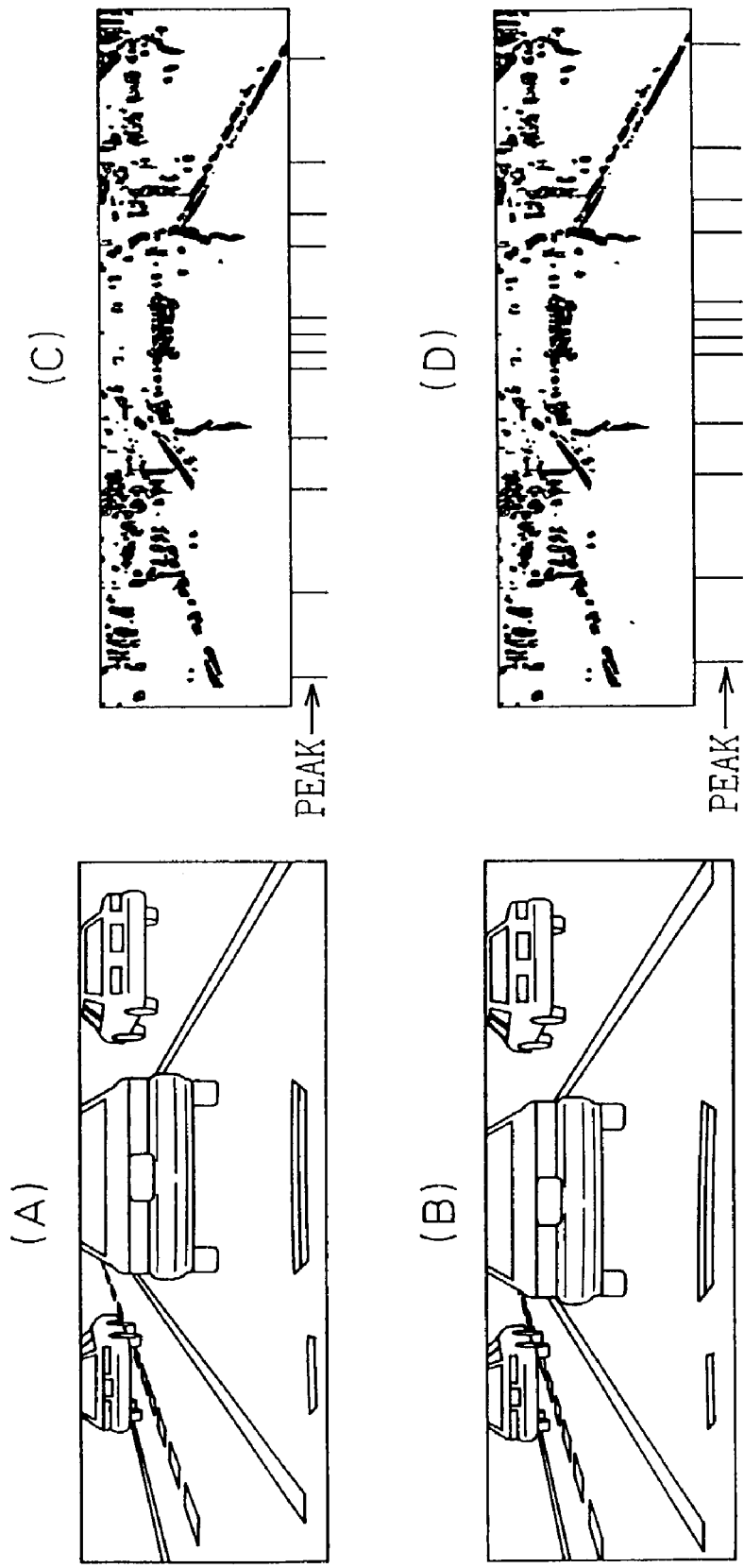

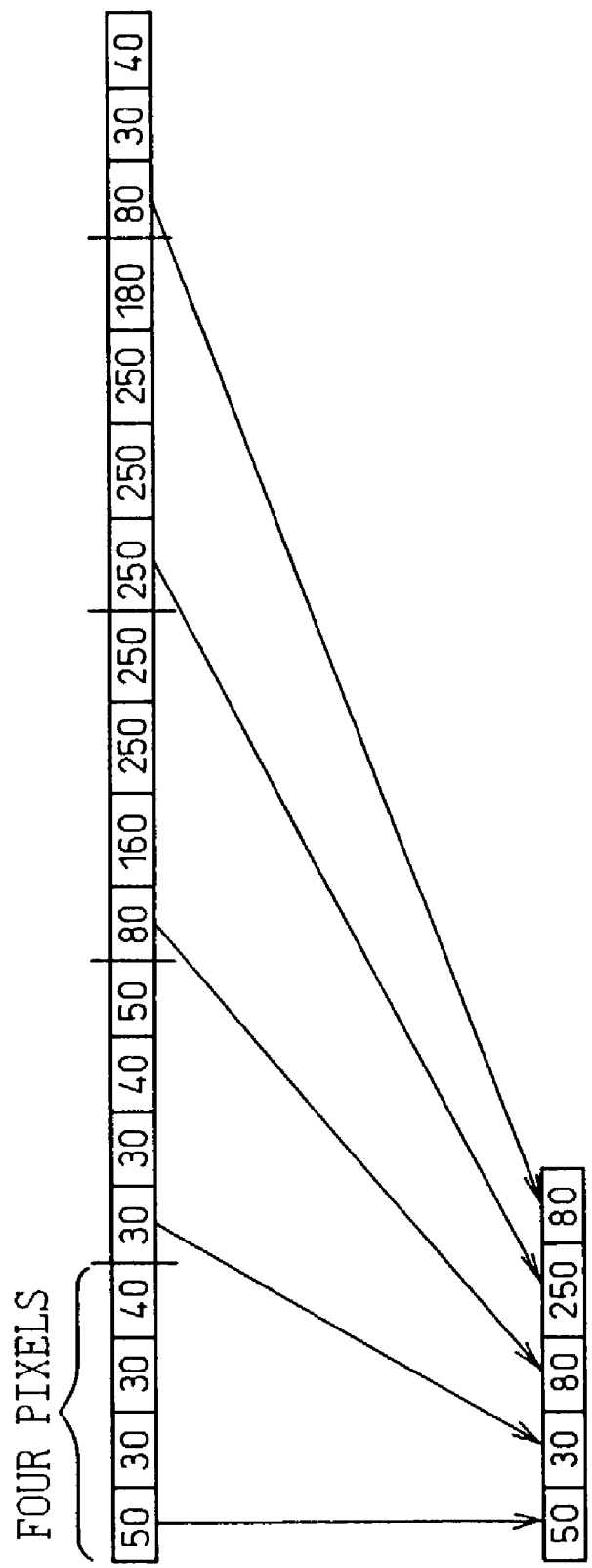

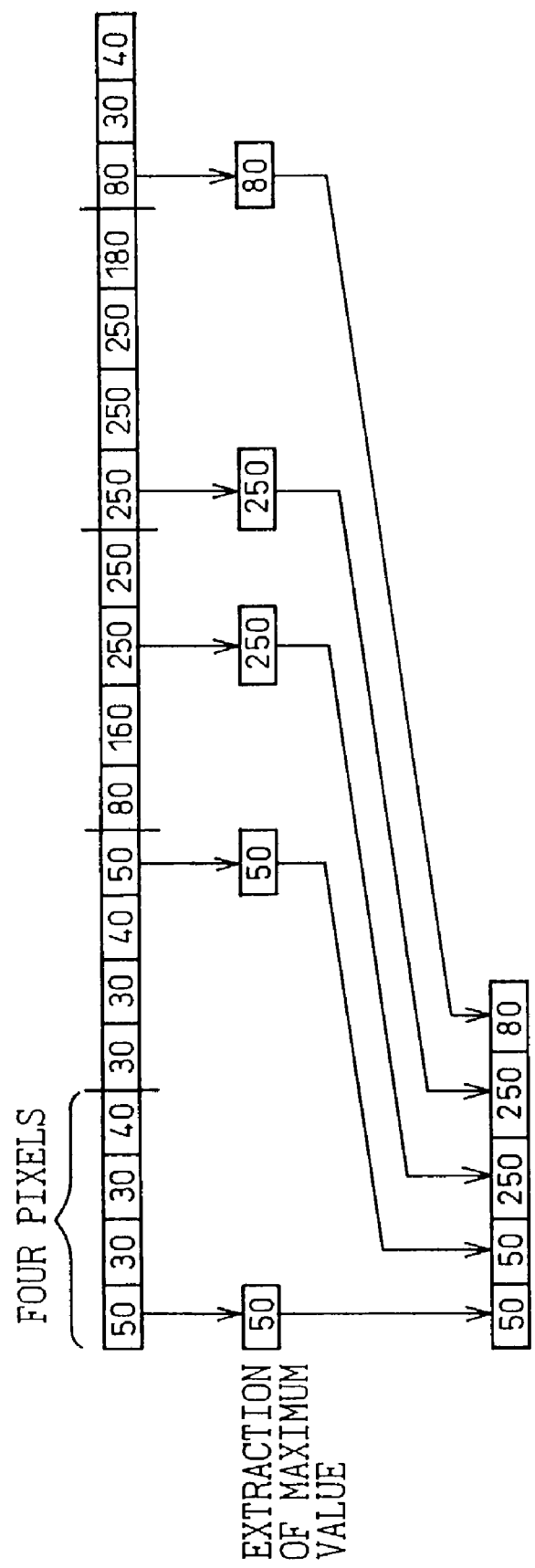

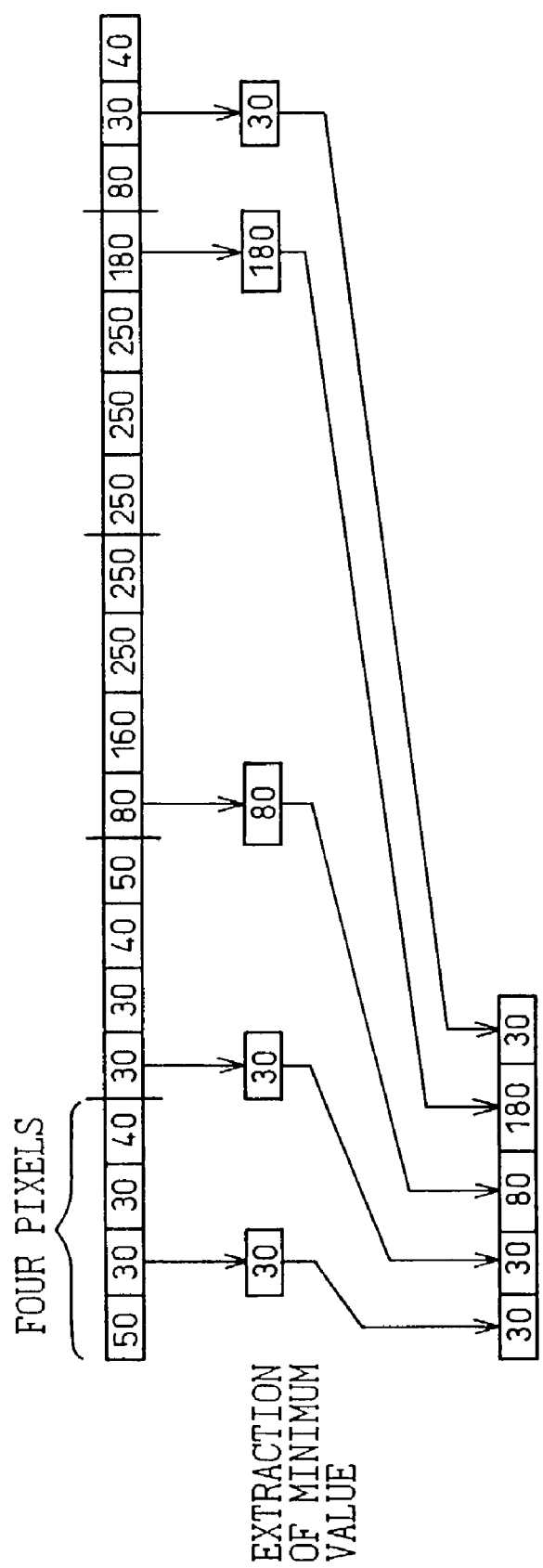

Fig.17
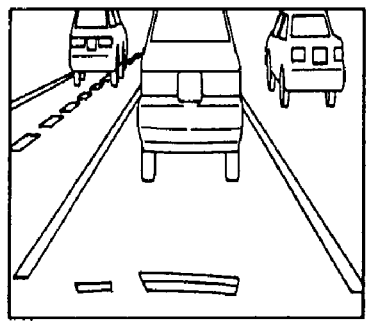
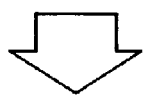
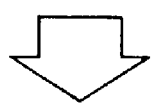
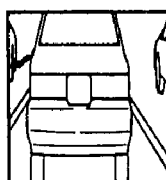
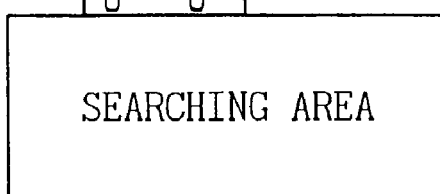

TARGET RECOGNITION APPARATUS

CROSS-REFERENCE TO RELATED APPLICATION

This application claims priority of Japanese Patent Application No. 2001-8125, filed on Jan. 16, 2001.

BACKGROUND OF THE INVENTION

1. Field of the Invention

The present invention relates to a target recognition apparatus. The invention particularly relates to a target recognition apparatus that measures a distance from a vehicle to a target, based on parallax information from two images of the target simultaneously picked up by two cameras (a left camera and a right camera) that are mounted on the vehicle, with a predetermined distance between the cameras in a horizontal direction.

2. Description of the Related Art

Conventionally, there has been known a target recognition apparatus that measures a distance from a vehicle to a target, based on parallax information from of target images picked up by two cameras that are mounted on the vehicle at positions at the same height above ground level, with a predetermined distance between the cameras. Generally, this kind of target recognition apparatus generates edge images by carrying out an edge extraction processing to an input left image that is input after the left camera has picked up this image, and an input right image that is input after the right camera has picked up this image. The target recognition apparatus measures a distance to the target, based on a parallax between the corresponding edge positions in the two edge images.

A filter that passes only vertical components of the photographed images is used as an edge extracting filter that carries out an edge extraction processing of the photographed images. Therefore, when a vehicle has an angular shape, it is easy to extract both end portions of the vehicle as edges. However, when a vehicle has a curved surface on the side surface and has a relatively round cross-sectional shape, it is difficult to detect vertical components, and thus, it is difficult to extract edges.

Further, when cameras that can pick up images of a wide-angular range are used, a photographed vehicle appears to have a round shape even if the vehicle has actually an angular shape with many vertical components. This is due to a distorted astigmatism. Therefore, it becomes difficult to extract edges. As explained above, when a target that has curves at both end portions is photographed, edges at the ends of the target do not always appear on the photograph, even if the edge extraction processing is carried out on the photographed target. Therefore, it is not easy to specify both ends of the target, that is, a width of the target.

SUMMARY OF THE INVENTION

The present invention has been made in the light of the above problems. It is, therefore, an object of the present invention to provide a target recognition apparatus that can improve a recognition rate of a target by emphasizing vertical components, even if a cross-sectional shape of the target is round, and it is difficult to extract edges at both ends of the target.

A target recognition apparatus of the present invention that achieves the above object is a target recognition apparatus that measures a distance from a vehicle to a target. The target recognition apparatus comprises: two cameras that are mounted on the vehicle at positions at the same height above ground level, with a predetermined distance between the cameras; an image compressing unit that compresses an image in at least a lateral direction, for each of a left image and a right image that are input after the images are picked up simultaneously with the two cameras; a target detecting unit that detects both ends of the target in each of the left image and the right image, based on gradations of pixels in the images that have been compressed in at least a lateral direction; and a distance measuring unit that measures a distance to the target, based on a parallax of the both detected ends of the target.

The image compressing unit of the target recognition apparatus according to the present invention can have the following modes.

(1) The image compressing unit compresses the images in only a lateral direction.

(2) The image compressing unit compresses the images in a lateral direction, and also compresses the images in a vertical direction at a smaller compression rate than the compression rate of the images in a lateral direction.

(3) The image compressing unit compresses the images in a lateral direction, by extracting pixels of the images in a lateral direction at every predetermined plurality of pixels.

(4) The image compressing unit compresses the images in a lateral direction, by putting pixels that continue in a lateral direction in the images into groups of pixels, each group having a predetermined plurality of pixels, and by extracting a pixel that has a maximum gradation among pixels in each group.

(5) The image compressing unit compresses the images in a lateral direction, by putting pixels that continue in a lateral direction in the images into groups of pixels, each group having a predetermined plurality of pixels, and by extracting a pixel that has a minimum gradation among pixels in each group.

(6) The image compressing unit puts pixels that continue in a lateral direction in the images into groups of pixels, each group having a predetermined plurality of pixels, compresses the images in a lateral direction by setting each group as one pixel, and fixes a gradation of this one pixel as an average value of gradations of pixels in each group.

(7) The image compressing unit puts pixels that continue in a lateral direction in the images into groups of pixels, each group having a predetermined plurality of pixels, compresses the images in a lateral direction by setting each group as one pixel, and fixes a gradation of this one pixel as a total sum of gradations of pixels in each group.

(8) The image compressing unit puts pixels that continue in a lateral direction in the images into groups of pixels, each group having a predetermined plurality of pixels, compresses the images in a lateral direction by setting each group as two pixels, and extracts a maximum value and a minimum value of gradations of pixels in the order of appearance in each group, as gradations of the two pixels.

(9) The image compressing unit puts pixels that continue in a lateral direction in the images into groups of pixels, each group having a predetermined plurality of pixels, compresses the images in a lateral direction by setting each group as two pixels, and extracts two gradations between which there is a largest change in each group, as gradations of the two pixels.

Further, the target recognition apparatus of the present invention can further comprise a searching area setting unit that sets a target searching area to images that have been compressed by the image compressing unit.

Further, the searching area setting unit can set a searching area in the following methods.

(A) The searching area setting unit sets a whole surface of an image as a target searching area.

(B) The searching area setting unit sets a lane on which the vehicle runs as a target searching area.

(C) The searching area setting unit sets an area to which the vehicle proceeds as a target searching area.

(D) The searching area setting unit sets a target searching area based on an area in which the target detecting unit has both detected ends of a target last time.

(E) The searching area setting unit sets an area in which another decision unit has decided that there is a possibility of existence of a target, as a searching area.

Further, the target detecting unit of the present invention can have the following operation modes.

(a) The target detecting unit detects both ends of a target by detecting edges.

(b) The target detecting unit detects a range in a lateral direction in which a variance in added values of gradations in a vertical direction is not larger than a constant value, as an existence position of a target.

(c) The target detecting unit detects a position in a lateral direction at which an added value of gradations in a vertical direction exceeds a constant value, and a position in a lateral direction at which the added value is less than the constant value, as both ends of a target.

(d) The target detecting unit detects a range in a lateral direction in which a variance in average values of gradations in a vertical direction is not larger than a constant value, as an existence position of a target.

(e) The target detecting unit detects a position in a lateral direction at which an average value of gradations in a vertical direction exceeds a constant value, and a position in a lateral direction at which the average value is less than the constant value, as both ends of a target.

According to the present invention, an S/N ratio is improved and vertical components are emphasized, by compressing the images picked up with cameras in a lateral direction, thereby to improve a recognition rate of a target. Based on this, it becomes possible to stabilize the performance of measuring a distance by the target recognition apparatus, which it has been difficult to achieve in the past due the shapes of vehicles. Further, it becomes possible to shorten the processing time. It is possible to further shorten the processing time by limiting a searching area.

SUMMARY OF THE INVENTION

The present invention will be more clearly understood from the description as set forth below with reference to the accompanying drawings.

FIG. 1 shows diagrams that are left and right input images and edge images corresponding to these images. (A) shows an input left image picked up with a left camera, (B) shows an input right image picked up with a right camera, (C) shows an edge image of (A), and (D) shows an edge image of (B).

FIG. 2 is a block diagram that shows a hardware structure of a target recognition apparatus according to one embodiment of the present invention.

FIG. 4 shows diagrams that explain calculation of parallax based on left and right edge images that are extracted from left and right input images. (A) shows an input left image, (B) shows an input right image, (C) shows a left edge image, and (D) shows a right edge image.

FIG. 6 is a diagram that explains a first method of compressing an image in a lateral direction.

FIG. 7 is a diagram that explains a second method of compressing an image in a lateral direction.

FIG. 8 is a diagram that explains a third method of compressing an image in a lateral direction.

FIG. 17 is a diagram that explains a fifth method of setting a searching area.

DESCRIPTION OF THE PREFERRED EMBODIMENTS

Figure 3A:
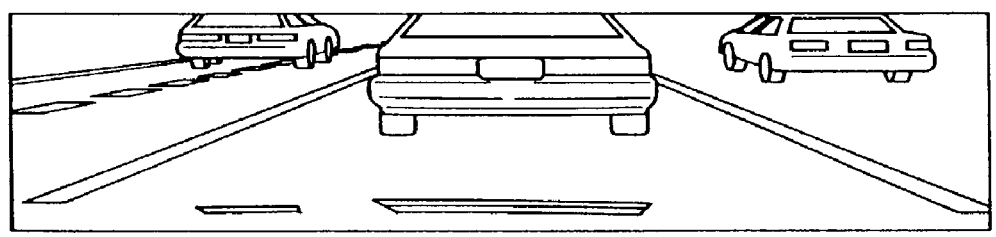
FIG. 3A shows an input image that is picked up with one camera.

Before describing the preferred embodiments, an explanation will be given of a conventional target recognition apparatus shown in FIG. 1.

Two cameras are installed on a vehicle at positions from which it is possible to look through the front of the vehicle. The cameras are positioned at the same height, with a predetermined distance between the cameras. When the two cameras photograph the front view while the vehicle is running on a three-lane road, two images, as shown in FIGS. 1(A) and (B), are obtained. When a target vehicle is running in front of the vehicle at this time, this vehicle running in the front is photographed as the target in the two images. When an edge extraction processing is carried out to the image (A), an edge image as shown in (C) is generated. When an edge extraction processing is carried out to the image (B), an edge image as shown in (D) is generated.

In comparing the image of (C) with the edge image of (D) in FIG. 1, it can be understood that a parallax exists between these images. According to the conventional target recognition apparatus using two cameras, the apparatus measures a distance to the target based on parallax information in the edge images.

As an edge extraction filter that carries out this type of edge extraction processing, a filter that passes only vertical components is generally used. Therefore, when a vehicle has a relatively round shape by having a side surface structured in curves, it is not easy to obtain edges. Further, when cameras having wide-angle lenses are used, picked-up images of a vehicle appear round although the vehicle has actually an angular shape. Therefore, it becomes difficult to extract edges. As explained above, according to the conventional target recognition apparatus, it has not always been possible to obtain edges at ends of a target, even when an edge processing is carried out to the picked-up images. Therefore, there has been a problem that it is difficult to specify both ends of a target, that is, a width of a target.

The present invention has been made in the light of the above problems of the conventional target recognition apparatus. Structures of embodiments of a target recognition apparatus according to the present invention will be explained below.

FIG. 2 is a block diagram that shows a hardware structure of a target recognition apparatus 30 relating to one embodiment of the present invention. A left camera 22 and a right camera 24 are installed at positions at the same height above ground level on a vehicle, with a predetermined distance between the cameras. The left camera 22 and the right camera 24 incorporate image pick-up devices like charge-coupled devices (CCD) respectively. Images picked up with these cameras 22 and 24 are output as electric signals corresponding to the numbers of pixels of the image pick-up devices. The input image signals from the left camera 22 and the right camera 24 are input to a digital signal processor (DSP) 36 via corresponding image signal receiving circuits 32 and 34 respectively. The images are stored in a static RAM 38.

The DSP 36 executes lateral-direction compression processing, to be described later, on the left image and the right image stored in the static RAM 38, and executes edge extraction processing on these compressed images, thereby to generate left and right edge images. The DSP 36 transmits parallax information, on edges corresponding to the left and right edge images, to a microcomputer 40.

The microcomputer 40 calculates and obtains a distance to the target from this parallax information. Next, the microcomputer 40 transmits the obtained target recognition information to a vehicle control unit 52 that carries out a support and risk avoidance operation, and an alarm unit 54 that can notify a driver.

Figure 3B:
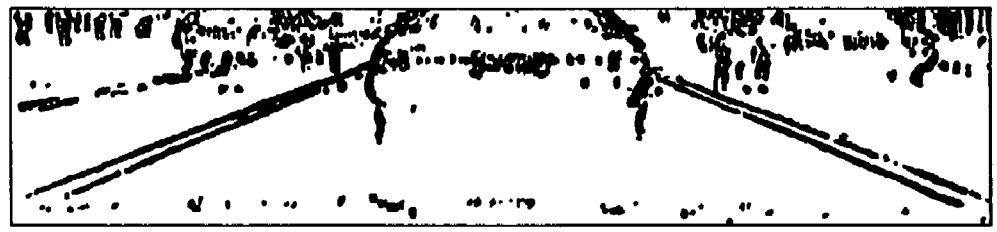
FIG. 3B shows an edge image obtained by carrying out an edge processing to the input image of FIG. 3A.

FIG. 3A shows one example of an input image that is picked up with one of the cameras mounted on the vehicle, and is input to the target recognition apparatus 30. In the example shown in FIG. 3A, three vehicles are running in front of the camera, and these vehicles become targets. This input image is a group of pixels corresponding to the number of pixels of the image pick-up device. When edge extraction processing for differentiating gradations of the pixels in a lateral direction is carried out on the input image shown in FIG. 3A, an edge image shown in FIG. 3B is obtained. The edge extraction processing is carried out to both the left image and the right images that are the input images.

FIG. 4 shows input images and edge images of the same status as that of FIG. 3A picked up with two cameras. (A) shows an input left image, (B) shows an input right image, (C) shows an edge image of (C), and (D) shows an edge image of (B). Calculation of parallax based on the left and right edge images that are extracted from the left and right input images will be explained. A peak position and peak power of a characteristic point are extracted from the edge images shown in (C) and (D) respectively. Next, a parallax is calculated for the characteristic point (each peak).

It is not always possible to obtain edges at ends of a target as described above. Therefore, it is not easy to specify both ends of the target, that is, a width of the target. In the present invention, an S/N ratio of an image is improved and vertical components are emphasized, by using images compressed in a lateral direction, thereby to improve a recognition rate of a target.

A reason why the S/N ratio improves when edge extraction is carried out by using images compressed in a lateral direction will be explained. When an edge extraction is carried out using a non-compressed image, an edge image as shown in FIG. 3B is obtained. At the time of extracting a characteristic point to specify a vehicle position and a vehicle width, this work receives the influence of noise other than a target, for example, noise components of a background and the like, when a non-compressed image is used. Consequently, it becomes difficult to extract edges. However, when the obtained image is compressed in a lateral direction in order to reduce the noise components, irregular noise components can be cut, and the S/N ratio improves. The actual vehicle components remain even after a compression of the image in a lateral direction. Therefore, it becomes possible to extract edges.

Examples of compressing an image in only a lateral direction will be explained below. However, the present invention is not limited to these examples. The present invention also includes a method of compressing an image to both a lateral direction and a vertical direction, at a compression rate in a lateral direction larger than a compression rate in a vertical direction. In other words, the present invention also includes a method of compressing an image in a vertical direction but at a smaller compression rate than a compression rate of compressing the image in a lateral direction.

Figure 5A:
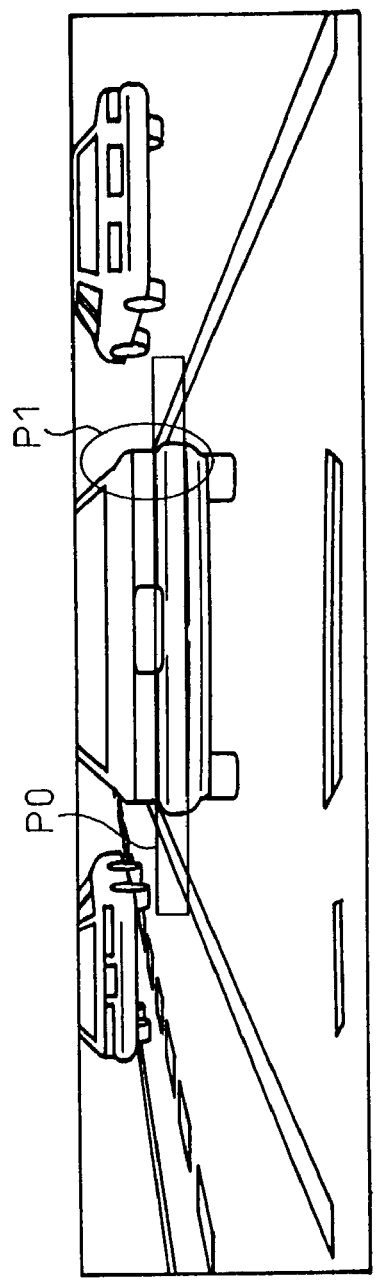
FIG. 5A shows an input image that is picked up with one camera.
Figure 5B:
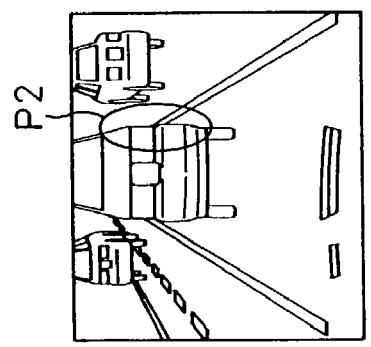
FIG. 5B shows an image compressed in a lateral direction, obtained by carrying out an image lateral-direction compression processing to the input image shown in FIG. 5A.

FIG. 5A to FIG. 5E are diagrams for explaining an image lateral-direction compression processing. In the embodiment of the present invention, an input image shown in FIG. 5A is transformed to an image compressed in a lateral direction as shown in FIG. 5B, before an edge extraction processing is carried out. In this example, an image that has 480 pixels in a vertical direction and 640 pixels in a lateral direction is compressed to a quarter in only the lateral direction. As a result, the compressed image has 480 pixels in a vertical direction and 160 pixels in a lateral direction.

In the case of a normal image shown in FIG. 5A, both ends of a vehicle are round as shown at a portion P1. When the image is compressed as shown in FIG. 5B, both ends of the vehicle are close to vertical as shown at a portion P2. Therefore, it becomes possible to carry out a stable recognition of the target, without being affected by the shape of the vehicle (particularly, a rounded vehicle having curves on the side surface of the vehicle). Several methods are considered for the compression processing in a lateral direction.

Figure 5C:
FIG. 5C is a diagram of level values that show gradation levels of pixels that exist in a frame P0 of the image shown in FIG. 5A, in numerical values from 0 to 255.

Assume that a part of an area P0 shown by a square in the image of FIG. 5A is constructed of pixels schematically shown in FIG. 5C. A compression method will be explained taking this portion as an example. Although FIG. 5A shows the area P0 as if there exists a plurality of pixels in its vertical direction in the width, there is actually only one pixel in a vertical direction in the area P0. FIG. 5C shows gradations of pixels at respective pixel positions, when there are 19 pixels in a lateral direction at a part of the area P0. The gradations of the pixels take a value range from 0 to 255. The gradation of a pure white pixel that has no image has a value 0, and the gradation of a black pixel has a value 255.

Figure 5D:
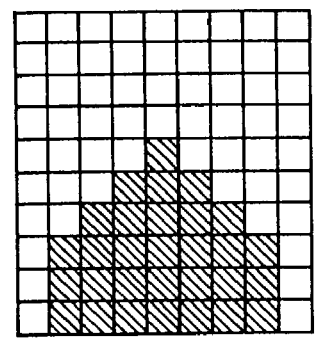
FIG. 5D is a diagram that shows an enlarged image of a part of an image before the compression, to facilitate the understanding of pixels.
Figure 5E:
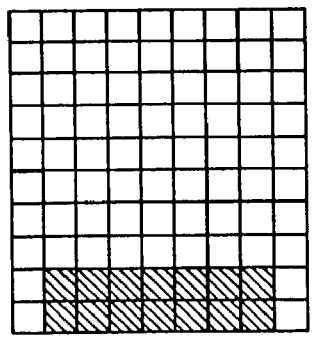
FIG. 5E is a diagram that shows an image obtained by compressing the image of FIG. 5D in a lateral direction.

When the image is compressed in a lateral direction, for example, an image that has pixels in a layout convex to the right as shown in FIG. 5D becomes an image that is compressed in a lateral direction as shown in FIG. 5E. The pixels of the target that exist with a variance of four to five pixels in a lateral direction are put together in one pixel in a lateral direction. As a result, vertical components can be emphasized.

FIG. 6 is a diagram that explains a first method of compressing an image in a lateral direction. The upper row shows gradations of a normal image, and the lower row shows gradations after the image has been compressed in a lateral direction. In the first method, gradations of pixels are extracted at every predetermined plurality of pixels in a lateral direction. In the example shown in FIG. 6, the image compressed in a lateral direction is prepared by obtaining data of every four pixels.

FIG. 7 is a diagram that explains a second method of compressing an image in a lateral direction. In the second method, a predetermined plurality of pixels that continue in a lateral direction are collected as one group, and a maximum value of gradations is extracted in each group. In the example shown in FIG. 7, four pixels are collected as one group, and the image compressed in a lateral direction is prepared by obtaining a maximum value data in each group. At night, the total image becomes dark, in a tunnel or the like. In this case, it becomes easy to specify a target when a maximum value data is employed in this method.

FIG. 8 is a diagram that explains a third method of compressing an image in a lateral direction. In the third method, a predetermined plurality of pixels that continue in a lateral direction are collected as one group, and a minimum value of gradation is extracted in each group. In the example shown in FIG. 8, four pixels are collected as one group, and the image compressed in a lateral direction is prepared by obtaining a minimum value data in each group. In daytime, when the total image becomes bright, it becomes easy to specify a target by employing a minimum value data.

Figure 9:
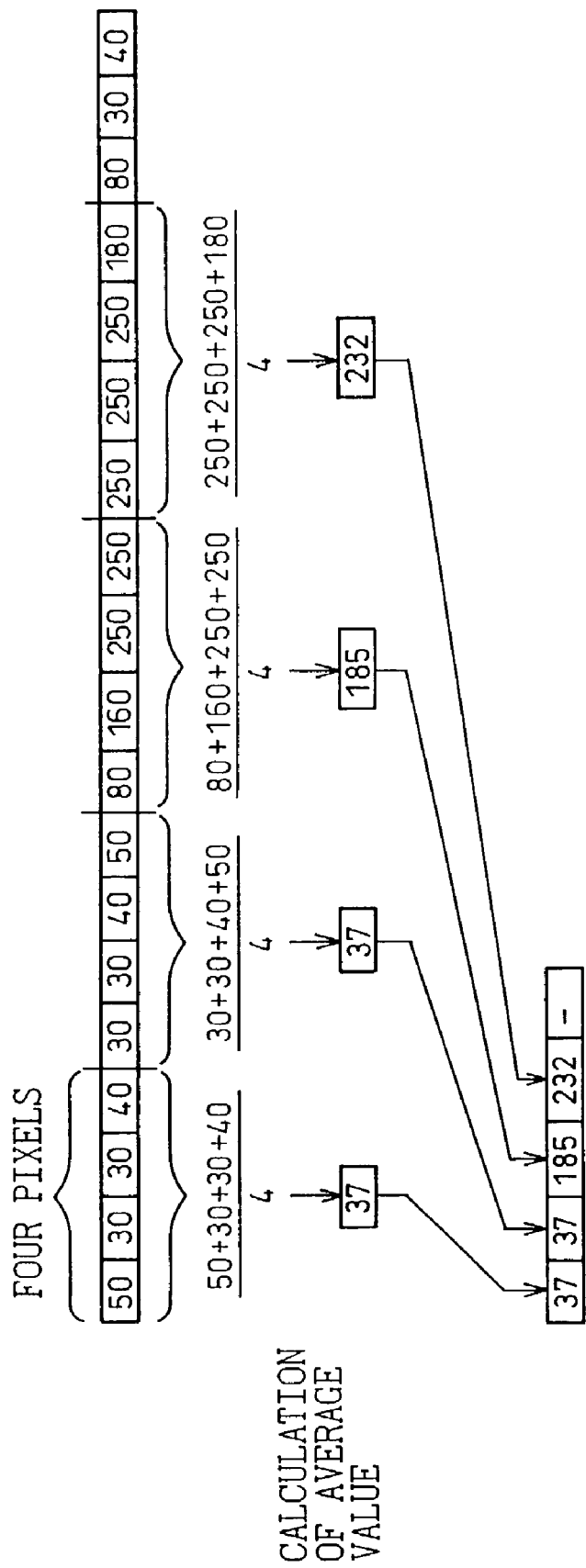
FIG. 9 is a diagram that explains a fourth method of compressing an image in a lateral direction.

FIG. 9 is a diagram that explains a fourth method of compressing an image in a lateral direction. In the fourth method, a predetermined plurality of pixels that continue in a lateral direction are collected as one group, and an average value of gradations is extracted in each group. In the example shown in FIG. 9, four pixels are collected as one group, and the image compressed in a lateral direction is prepared by obtaining an average value data in each group. When an average value data is employed, it becomes possible to absorb a variance in an image.

Figure 10:
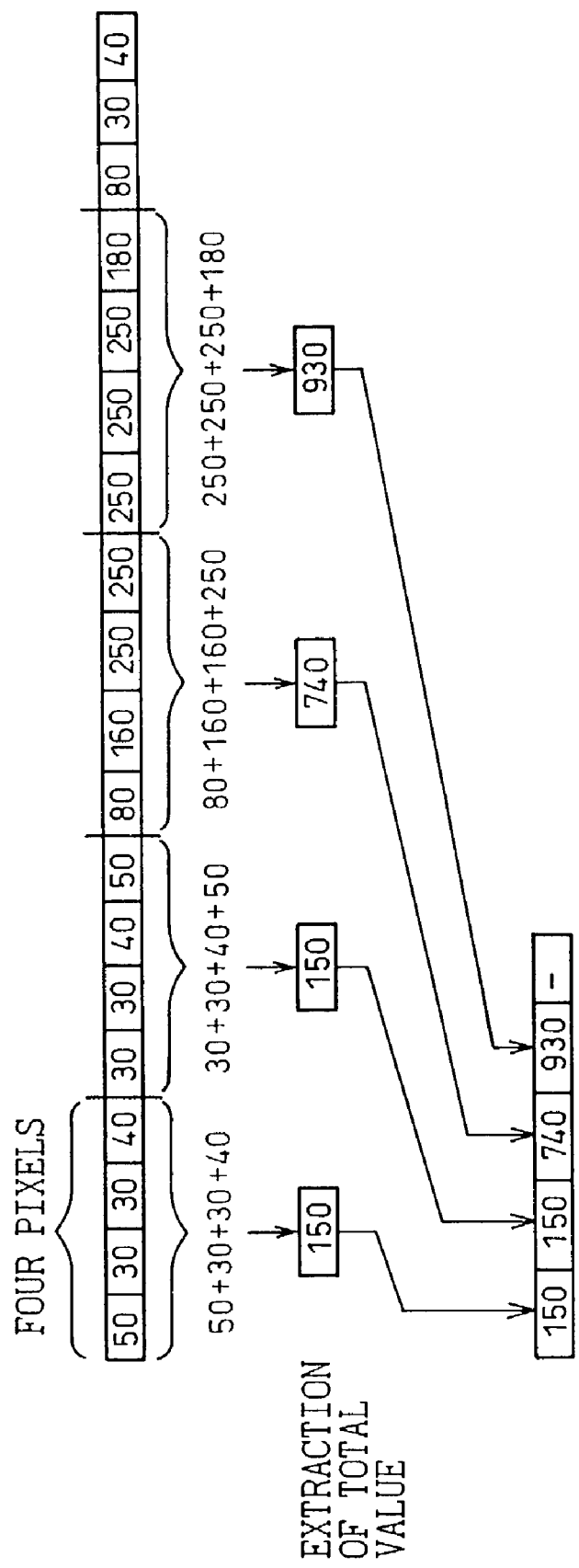
FIG. 10 is a diagram that explains a fifth method of compressing an image in a lateral direction.

FIG. 10 is a diagram that explains a fifth method of compressing an image in a lateral direction. In the fifth method, a predetermined plurality of pixels that continue in a lateral direction are collected as one group, and a total sum of gradations is extracted in each group. In the example shown in FIG. 10, four pixels are collected as one group, and the image compressed in a lateral direction is prepared by obtaining a total sum in each group. According to the above average value data, there is an inconvenience in that a setting range of a threshold value for specifying a target in the latter-stage processing becomes narrow. On the other hand, it becomes easy to set a threshold value when a decision is made based on a total sum.

Figure 11:
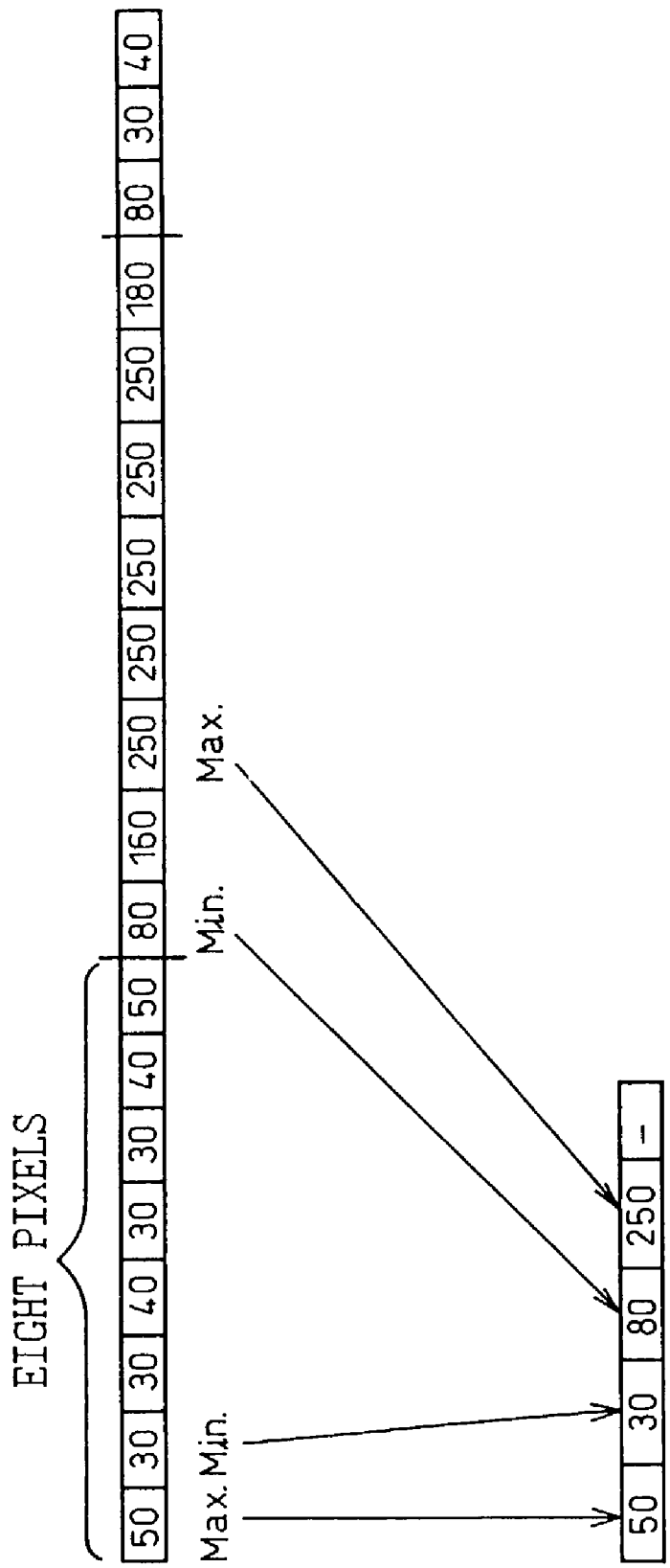
FIG. 11 is a diagram that explains a sixth method of compressing an image in a lateral direction.

FIG. 11 is a diagram that explains a sixth method of compressing an image in a lateral direction. In the sixth method, a predetermined plurality of pixels that continue in a lateral direction are collected as one group, and a maximum value and a minimum value of gradations are extracted in the order of appearance in each group. In the example shown in FIG. 11, eight pixels are collected as one group, and the image compressed in a lateral direction is prepared by obtaining a maximum value and a minimum value in each group. According to this method, it becomes possible to specify a target without being affected by bright or dark images, when a decision is made using maximum value and minimum value data at the same time.

Figure 12:
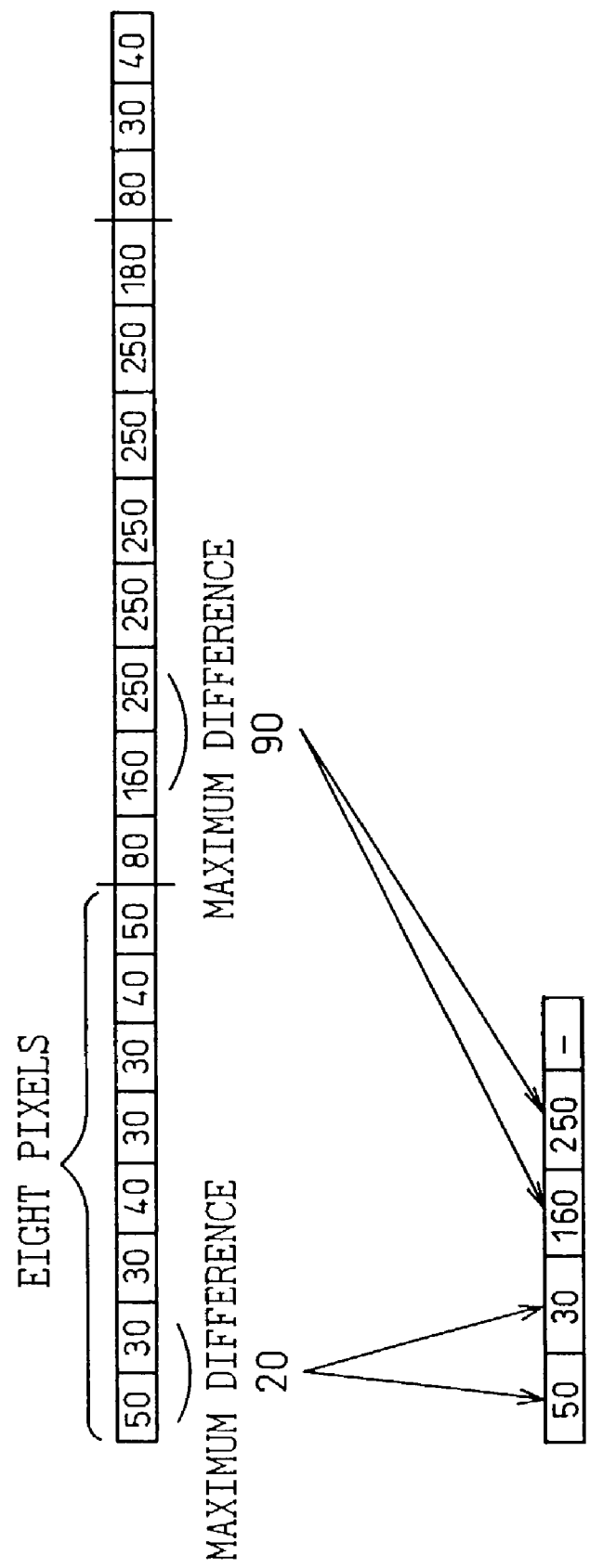
FIG. 12 is a diagram that explains a seventh method of compressing an image in a lateral direction.

FIG. 12 is a diagram that explains a seventh method of compressing an image in a lateral direction. In the seventh method, a predetermined plurality of pixels that continue in a lateral direction are collected as one group, and two gradations between which there is a largest change in each group are extracted. In the example shown in FIG. 12, eight pixels are collected as one group, and the image compressed in a lateral direction is prepared by obtaining values of two adjacent pixels. It becomes easy to recognize a target at a final stage, by understanding a change quantity of gradations at the compression time.

When the above image compression processing in a lateral direction is carried out in advance, it becomes easy to shorten the time required for the target recognition procession at a later stage. In order to further shorten this time, it is preferable to set a target searching area to the compressed image. FIG. 13 to FIG. 17 show methods of setting a searching area to the compressed image.

Figure 13:
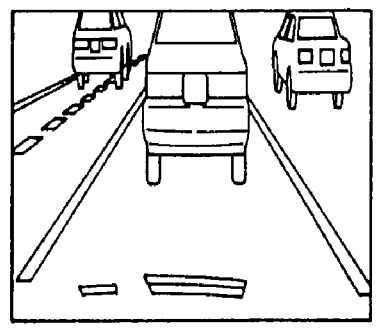
FIG. 13 is a diagram that explains a first method of setting a searching area.

A first setting method is a method of setting a whole surface of an image compressed in a lateral direction, as a searching area of a target, as shown in FIG. 13.

Figure 14:
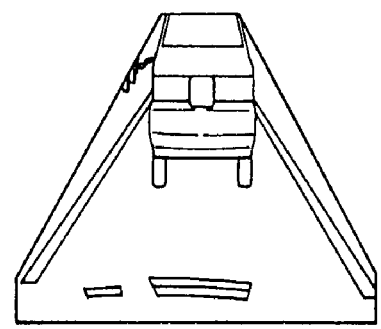
FIG. 14 is a diagram that explains a second method of setting a searching area.

A second setting method is a method of setting a lane (an area encircled with white lines) in which a vehicle mounted with a target recognition apparatus of the present invention runs, as a searching area of a target, as shown in FIG. 14.

Figure 15:
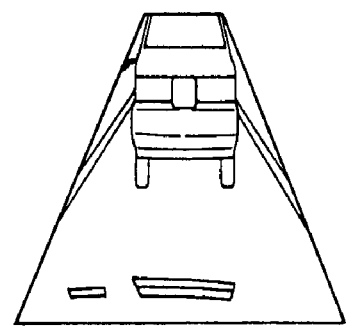
FIG. 15 is a diagram that explains a third method of setting a searching area.

A third setting method is a method of setting a triangular area in a vehicle proceeding direction, as a searching area of a target, as shown in FIG. 15.

Figure 16:
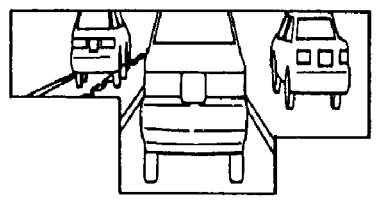
FIG. 16 is a diagram that explains a fourth method of setting a searching area.

A fourth setting method is a method of setting an area in which both ends of a target have been detected last time by a target detection processing to be described later, as a searching area of a target, as shown in FIG. 16. In this case, it is preferable to set a range slightly larger than the area in which both ends of a target have been detected last time, as the searching area.

A fifth setting method is a method of setting an area in which an edge-extraction decision unit has decided that there is a possibility of the existence of a target from an edge image prepared based on an image compressed in a lateral direction, as a searching area, as shown in FIG. 17.

According to the present invention, the DSP 36 explained with reference to FIG. 2 carries out a target detection processing that detects both ends of a target based on gradations of pixels, in the images compressed in a lateral direction, or in the searching areas that have been set to the images according to the first to fifth setting methods.

Figure 18:
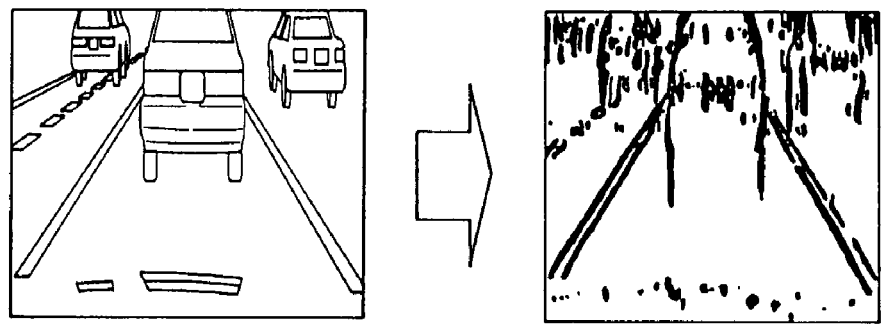
FIG. 18 is a diagram that explains a method of detecting both ends of a target by extracting edges.

For the target detection processing, there is a method of detecting both ends of a target by carrying out the edge extraction as shown in FIG. 18.

Figure 19:
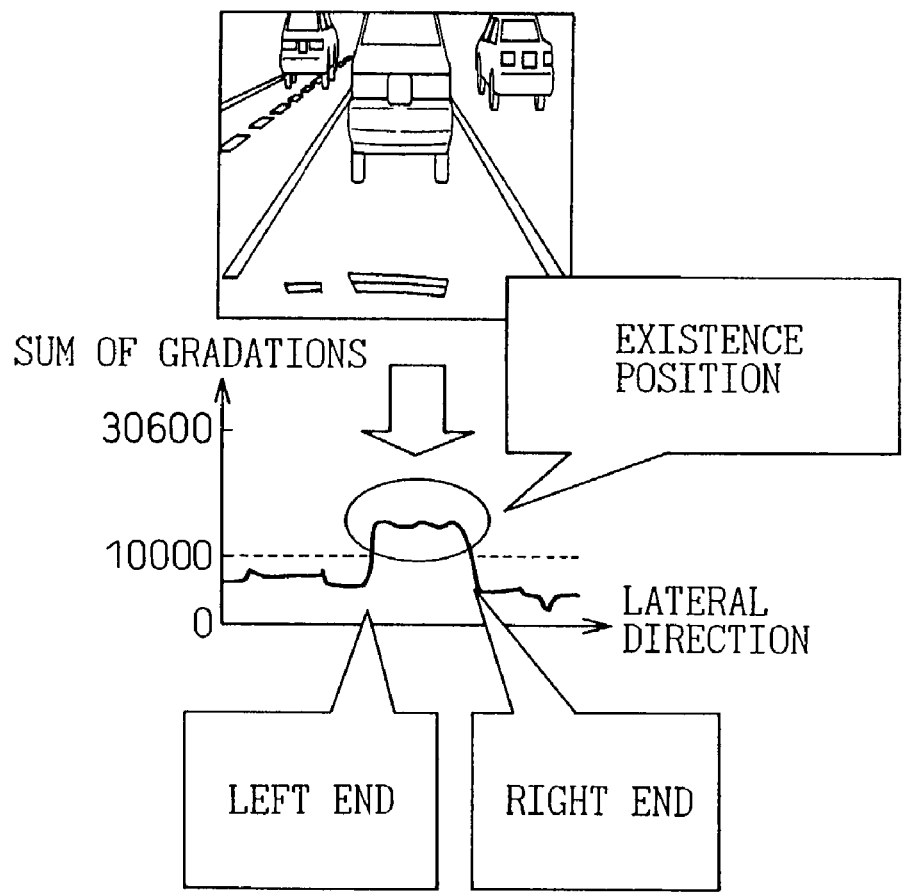
FIG. 19 is a diagram that explains a method of detecting both ends of a target based on an added value of gradations in a vertical direction.

Further, as shown in FIG. 19, it is also possible to detect a range in a lateral direction in which a variance in added values of gradations in a vertical direction is not larger than a constant value, as an existence position of a target. However, it is necessary to obtain values of a road surface in advance based on a background processing, and exclude the road surface.

Alternately, as shown in FIG. 19, it is possible to recognize a position in a lateral direction at which an added value of gradations in a vertical direction exceeds a reference value (10000 in this drawing), as the body of the vehicle running in the front, and detect positions in a lateral direction at which this value is lowered from an area in which this value exceeds the reference value to an area in which this value is less than the reference value, as both ends of the target.

Figure 20:
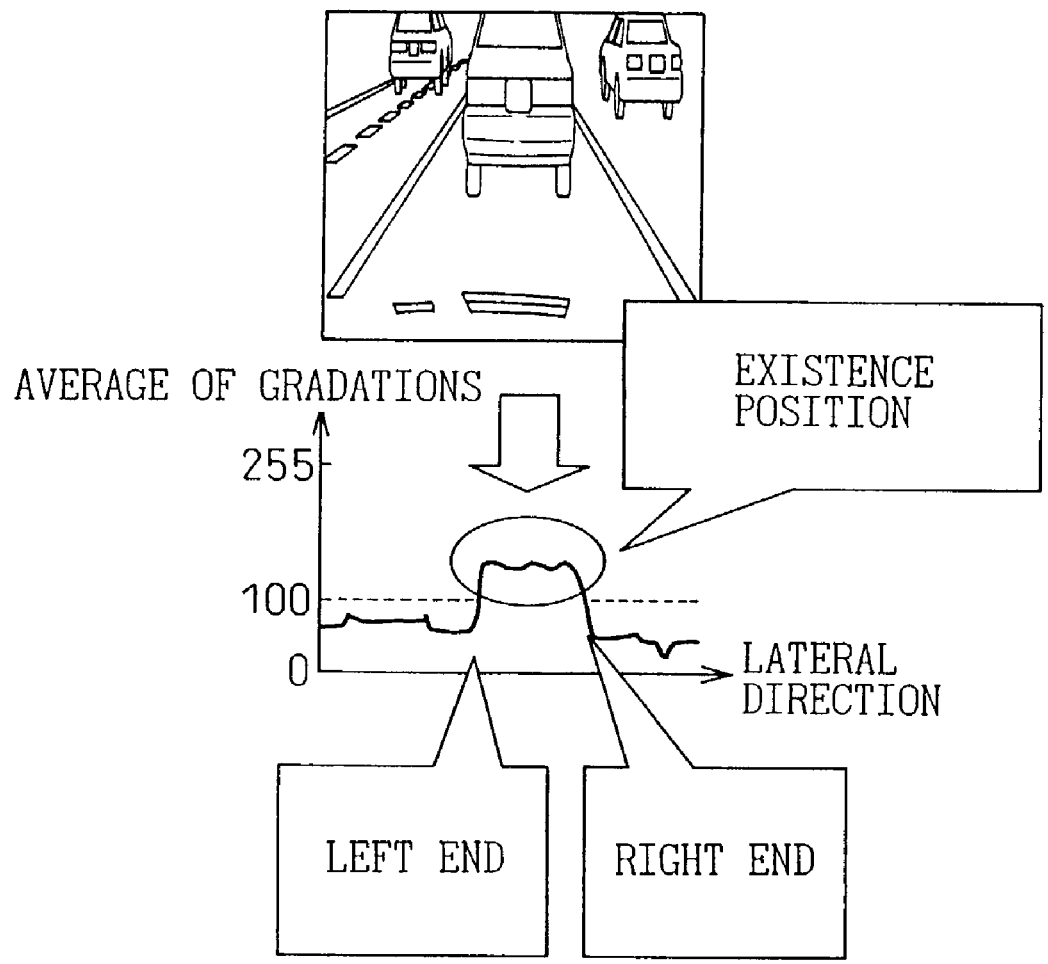
FIG. 20 is a diagram that explains a method of detecting both ends of a target based on an average value of gradations in a vertical direction.

Further, as shown in FIG. 20, it is also possible to detect a range in a lateral direction in which a variance in average values of gradations in a vertical direction is not larger than a constant value, as an existence position of a target. However, it is necessary to obtain values of a road surface in advance based on a background processing, and exclude the road surface.

Alternately, as shown in FIG. 20, it is possible to recognize a position in a lateral direction at which an average value of gradations in a vertical direction exceeds a reference value (100 in this drawing), as a body of the vehicle running in the front, and detect positions in a lateral direction at which this value is lowered from an area in which this value exceeds the reference value to an area in which this value is less than the reference value, as both ends of the target.

In the case of detecting an existence position and both ends of a target according to the processing explained with reference to FIG. 19 or FIG. 20, it is preferable to provide a constant margin and detect a target in a slightly larger range, thereby to increase the stability.

I claim:

1. A target recognition apparatus that measures a distance from a vehicle to a target, the target recognition apparatus comprising:
   two cameras that are mounted on the vehicle at positions at the same height above ground level, with a predetermined distance between the cameras;
   an image compressing unit that compresses an image in at least a lateral direction, to such an extent that vertical components at both ends of a target in the image are emphasized, for each of a left image and a right image that are input after the images are picked up simultaneously with the two cameras;
   a target detecting unit that detects both ends of the target in each of the left image and the right image, based on gradations of pixels in the images that have been compressed in at least a lateral direction; and
   a distance measuring unit that measures a distance to the target, based on a parallax of both detected ends of the target.

2. The target recognition apparatus according to claim 1, wherein
   the image compressing unit compresses the images only a lateral direction.

3. The target recognition apparatus according to claim 1, wherein
   the image compressing unit compresses the images in a lateral direction, and also compresses the images in a vertical direction at a smaller compression rate than a compression rate of the images in a lateral direction.

4. The target recognition apparatus according to claim 1, wherein
   the image compressing unit compresses the images in a lateral direction, by extracting pixels of the images in a lateral direction at every predetermined plurality of pixels.

5. The target recognition apparatus according to claim 1, wherein
   the image compressing unit compresses the images in a lateral direction, by grouping pixels that continue in a lateral direction in the images into groups of pixels, each group having a predetermined plurality of pixels, and by extracting a pixel that has a maximum gradation among pixels in each group.

6. The target recognition apparatus according to claim 1, wherein
   the image compressing unit compresses the images in a lateral direction, by grouping pixels that continue in a lateral direction in the images into groups of pixels, each group having a predetermined plurality of pixels, and by extracting a pixel that has a minimum gradation among pixels in each group.

7. The target recognition apparatus according to claim 1, wherein
   the image compressing unit puts pixels that continue in a lateral direction in the images into groups of pixels, each group having a predetermined plurality of pixels, compresses the images in a lateral direction by setting each group as one pixel, and fixes a gradation of this one pixel as an average value of gradations of pixels in each group.

8. The target recognition apparatus according to claim 1, wherein
   the image compressing unit puts pixels that continue in a lateral direction in the images into groups of pixels, each group having a predetermined plurality of pixels, compresses the images in a lateral direction by setting each group as one pixel, and fixes a gradation of this one pixel as a total sum of gradations of pixels in each group.

9. The target recognition apparatus according to claim 1, wherein
   the image compressing unit puts pixels that continue in a lateral direction in the images into groups of pixels, each group having a predetermined plurality of pixels, compresses the images in a lateral direction by setting each group as two pixels, and extracts a maximum value and a minimum value of gradations of pixels in the order of appearance in each group, as gradations of the two pixels.

10. The target recognition apparatus according to claim 1, wherein
    the image compressing unit puts pixels that continue in a lateral direction in the images into groups of pixels, each group having a predetermined plurality of pixels, compresses the images in a lateral direction by setting each group as two pixels, and extracts two gradations between which there is a largest change in each group, as gradations of the two pixels.

11. The target recognition apparatus according to claim 1, further comprising:
    a searching area setting unit for setting a target searching area according to images that have been compressed by the image compressing unit.

12. The target recognition apparatus according to claim 11, wherein
    the searching area setting unit sets a whole surface of an image as a target searching area.

13. The target recognition apparatus according to claim 11, wherein
the searching area setting unit sets a lane on which the vehicle runs as a target searching area.

14. The target recognition apparatus according to claim 11, wherein
the searching area setting unit sets an area to which the vehicle proceeds as a target searching area.

15. The target recognition apparatus according to claim 11, wherein
the searching area setting unit is setting a target searching area based on an area in which the target detecting unit has both detected ends of a target last time.

16. The target recognition apparatus according to claim 11, wherein
the searching area setting unit sets an area in which another decision unit has decided that there is a possibility of the existence of a target, as a searching area.

17. The target recognition apparatus according to claim 1, wherein
the target detecting unit detects both ends of a target by detecting edges.

18. The target recognition apparatus according to claim 1, wherein
the target detecting unit detects a range in a lateral direction in which a variance in added values of gradations in a vertical direction is not larger than a constant value, as an existence position of a target.

19. The target recognition apparatus according to claim 1, wherein
the target detecting unit detects a position in a lateral direction at which an added value of gradations in a vertical direction exceeds a constant value, and a position in a lateral direction at which the added value is less than the constant value, as both ends of a target.

20. The target recognition apparatus according to claim 1, wherein
the target detecting unit detects a range in a lateral direction in which a variance in average values of gradations in a vertical direction is not larger than a constant value, as an existence position of a target.

21. The target recognition apparatus according to claim 1, wherein
the target detecting unit detects positions in a lateral direction at which an added value of gradations in a vertical direction exceeds a constant value whose adjacent position in a lateral direction at which the added value is less than the constant value, as both ends of a target.

* * * * *

UNITED STATES PATENT AND TRADEMARK OFFICE
CERTIFICATE OF CORRECTION

PATENT NO. : 7,003,137 B2  
APPLICATION NO. : 10/052029  
DATED : February 21, 2006  
INVENTOR(S) : Ohta It is certified that error appears in the above-identified patent and that said Letters Patent is hereby corrected as shown below:

On the Title Page

(57) Abstract, line 4      Delete "edges are is",  
Insert --edges are--

Column 1, line 23      Delete "from of",  
Insert --of--

Column 3, line 43      Delete "which it has",  
Insert --which has--

Column 5, line 21      After "problem",  
Insert --in--

Column 9, line 58, Claim 2      After "compresses the images",  
Insert --in--

Column 11, line 13, Claim 15      Delete "both detected",  
Insert --detected both--

Signed and Sealed this

Nineteenth Day of December, 2006

JON W. DUDAS  
*Director of the United States Patent and Trademark Office*